United States Patent [19]

Minamisawa et al.

[11] Patent Number: 4,500,660
[45] Date of Patent: Feb. 19, 1985

[54] EPOXY RESIN COMPOSITION

[75] Inventors: Tsuyoshi Minamisawa; Yasuo Kogo; Yasuhisa Nagata, all of Shizuoka, Japan

[73] Assignee: Toho Belson Co., Ltd., Tokyo, Japan

[21] Appl. No.: 486,177

[22] Filed: Apr. 18, 1983

[30] Foreign Application Priority Data

Apr. 21, 1982 [JP] Japan .................................. 57-66504

[51] Int. Cl.³ .......................... C08K 7/06; C08L 63/02; C08L 63/04; C08L 63/10
[52] U.S. Cl. .................................... 523/428; 523/434; 523/438; 523/468; 525/113; 525/911
[58] Field of Search ................ 525/113, 911; 523/428, 523/434, 438, 468

[56] References Cited

U.S. PATENT DOCUMENTS

| 3,655,818 | 4/1972 | McKown | 525/113 |
| 3,707,583 | 12/1972 | McKown | 525/119 |
| 3,894,112 | 7/1975 | Pagel | 525/113 |
| 3,894,113 | 7/1975 | Pagel | 525/113 |
| 3,926,904 | 12/1975 | Scola | 525/113 |

FOREIGN PATENT DOCUMENTS

| 53-102996 | 9/1978 | Japan | 525/113 |
| 57-021450 | 2/1982 | Japan | 525/113 |

Primary Examiner—John C. Bleutge
Assistant Examiner—Robert E. L. Sellers
Attorney, Agent, or Firm—Sughrue, Mion, Zinn, Macpeak & Seas

[57] ABSTRACT

An epoxy resin composition having excellent adhesive and high mechanical strength is disclosed. The composition comprises:

(A) a bisphenol A type epoxy resin present in an amount of at least 45 wt % of the total epoxy resin;
(B) a novolak type epoxy resin present in an amount of at least 8 wt % of the total epoxy resin;
(C) a glycidyl amine type epoxy resin (including the one used in (D)) present in an amount of at least 15 wt % of the total epoxy resin;
(D) a reaction product of a butadiene-acrylonitrile copolymer having carboxyl groups on at least both ends of the molecule and a glycidyl amine type epoxy resin, said butadiene-acrylonitrile copolymer being present in an amount of 1.5 to 15 parts by weight per 100 parts by weight of the total epoxy resin;
(E) nitrile rubber present in an amount of 2 to 8 parts by weight per 100 parts by weight of the total epoxy resin; wherein the total epoxy resin is the total amount of epoxy resins (A), (B) and (C), as well as the glycidyl amine type epoxy resin used in preparing component (D);
(F) a curing agent consisting of dicyandiamide;
(G) a curing accelerator, and
(H) a reinforcing fiber to form a composition which exhibits good performance when it is used as a prepreg for composite.

26 Claims, No Drawings

EPOXY RESIN COMPOSITION

FIELD OF THE INVENTION

The present invention relates to an epoxy resin composition having high adhesive strength, and more particularly, to an epoxy resin composition that exhibits good properties when it contains fibers and is used as a prepreg.

BACKGROUND OF THE INVENTION

Honeycomb sandwich panels are characterized by their lightweight, high strength and high rigidity, so they are extensively used as structural members of aircraft. To meet the increasing demand for reducing the weight of aircraft, the honeycomb sandwich panel is fabricated by directly bonding the honeycomb to a prepreg without an adhesive. In this method, when the prepreg is heat-cured, the resin in it oozes out and acts as an adhesive for bonding to the honeycomb. Therefore, it is very important for the resin to have high adhesive strength, and at the same time, it must have good composite characteristics, especially high interlaminer shear strength (ILSS), for use as a surfacing material. Nevertheless, it has been difficult to meet these requirements simultaneously, because one characteristic cannot be improved without sacrificing the other. Furthermore, the resin must have a suitable degree of tackiness when fibers are incorporated therein to form a prepreg.

SUMMARY OF THE INVENTION

An object of the present invention is to provide an epoxy resin composition having improved adhesive and mechanical strength.

Another object of the present invention is to provide an epoxy resin composition that exhibits good performance when it is used as a prepreg.

Therefore, the present invention provides an epoxy resin composition comprising:

(A) a bisphenol A type epoxy resin present in an amount of at least 45 wt % of the total epoxy resin;

(B) a novolak type epoxy resin present in an amount of at least 10 wt % of the total epoxy resin;

(C) a glycidyl amine type epoxy resin (including the one used in (D)) present in an amount of at least 15 wt % of the total epoxy resin;

(D) a reaction product of a butadiene-acrylonitrile copolymer having carboxyl groups on at least both ends of the molecule and a glycidyl amine type epoxy resin, said butadiene-acrylonitrile copolymer being present in an amount of 1.5 to 15 parts by weight per 100 parts by weight of the total epoxy resin;

(E) nitrile rubber present in an amount of 2 to 8 parts by weight per 100 parts by weight of the total epoxy resin; wherein the total epoxy resin is the total amount of epoxy resins (A), (B) and (C), as well as the glycidyl amine type epoxy resin used in preparing component D;

(F) a curing agent consisting of dicyandiamide; and (G) a curing accelerator.

The present invention also provides an epoxy resin composition wherein the above-described epoxy resin composition further contains fibers.

The resin composition of the present invention has good adhesive and high mechanical strength, as well as high heat resistance. This resin composition cures at relatively low temperatures and can be handled very easily. The resin composition containing carbon fibers or other reinforcing fibers provides a product having good mechanical characteristics, especially high interlaminer shear strength and impact resistance.

DETAILED DESCRIPTION OF THE INVENTION

The respective components of the epoxy resin of the present invention are described hereunder.

(A) Bisphenol A type epoxy resins

A bisphenol A type epoxy resin is a condensation product of bisphenol A and epichlorohydrine (1) Those no-brominated and having an average epoxy equivalent preferably of from 150 to 1,000, more preferably from 300 to 600, are used. (The ratio of the molecular weight of the resin to the number of epoxy groups in the molecule is simply referred to an epoxy equivalent). The heat resistance of bisphenol A type epoxy resins having an epoxy equivalent more than about 1,000 is somewhat low. Illustrative bisphenol A type epoxy resins include Epikote 828, 834, 817, 1001, 1002, 1004, 1007 and 1009 (Shell Chemicals Corp.), Araldite CY 205, 230, 232 and 221, GY 257, 252, 255, 250, 260 and 280, Araldite 6071, 7071 and 7072 (Ciba-Geigy Corporation), Dow Epoxy DER 331, 332, 662, 663U and 662U (Dow Chemical Company), Epicron 840, 850, 855, 860, 1050, 3050, 4050 and 7050 (Dainippon Inki Kagaku Kogyo Co.), and Epototo YD-115, 115-CA, 117, 121, 127, 128, 128CA, 128 S, 134, 001Z, 011, 012, 014, 014 ES, 017, 019, 020 and 002 (Toto Kasei Co.).

(2) Brominated bisphenol A type epoxy resins having an epoxy equivalent preferably of from 200 to 600, more preferably from 220 to 500 and containing bromine in an amount of from 20 to 50 wt % based on the weight of the epoxy resin, are used. These resins are used to render the resin composition flame-retardant. Examples of such epoxy resin include Araldite 8011 (Ciba-Geigy Corporation) and Dow Epoxy DER 511 (Dow Chemical Co.).

(B) Novolak type epoxy resins

A novolak type epoxy resin is a reaction product of novolak resin and epichlorohydrine. Resins which have a molecular weight of 400 to 900 are preferably used.

(1) Phenolic novolak type epoxy resins.

Those having an epoxy equivalent preferably of 160 to 200, more preferably from 170 to 190, are used, and they include, for example, Epikote 152 and 154 (Shell Chemicals Corp.), Araldite EPN 1138 and 1139 (Ciba-Geigy Corporation), Dow Epoxy DEN 431, 438, 439 and 485 (Dow Chemical Company), EPPN 201 (Nippon Keyaku Co., Ltd.) and Epicron N 740 (Dainippon Inki Kagaku Kogyo Co.).

(2) Cresol novolak type epoxy resins.

Those having an epoxy equivalent preferably of from 180 to 260, more preferably, from 200 to 250 are used. Examples of such resins include, Ciga-Geigy ECN 1235, ECN 1273, ECN 1280 and ECN 1299 (manufactured by Ciba-Geigy Corporation), EOCN 102, 103 and 104 (manufactured by Nippon Kayaku Co.).

(C) Glycidylamine type epoxy resins

Those having at least one N,N-diglycidylamine group in a molecule of the epoxy resin and having an epoxy equivalent of 110 to 150, preferably from 120 to 135, are used. Such epoxy resins include, for example, N,N-diglycidylaniline, N,N,N',N'-tetraglycidyl-diaminodiphenylmethane (shown by formula (I)), N,N- diglycidyl-(m or p)-aminophenol glycidyl ether, and a mixture with oligomers (degree of polymerization is 2-4) thereof, which are commercially available under the trade names Araldite MY 720 (manufactured by Ciba-Geigy Corporation) or Epototo YH 434 and YDM 120 (Toto Kasei Co.), respectively. It is preferred to use an epoxy resin mixture containing the oligomers in an amount of 10 to 40 wt % based on the resin.

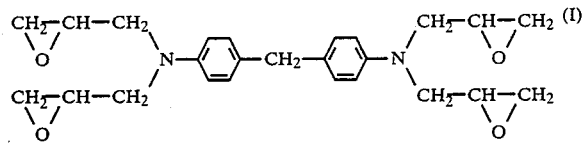

(D) Reaction products of butadiene-acrylonitrile copolymer and glycidylamine type epoxy resin The butadiene-acrylonitrile copolymer having carboxyl groups on at least both terminals of the molecule and which is reacted with a glycidylamine type epoxy resin to form component (D) is preferably liquid to facilitate the reaction with the epoxy resin and to provide a prepreg of good quality. More specifically, the copolymer preferably has a viscosity of about 500 to 8,000 poise, more preferably from about 1,000 to 7,000 poise, at 27° C. The butadiene-acrylonitrile copolymers which are solid provide a composite having somewhat low heat resistance. The acrylonitrile content of the copolymer is generally from 10 to 35 wt %, preferably from 15 to 30 wt %. The copolymer may contain up to 3 carboxyl groups including those at the two terminals, and such copolymer can be prepared by using at least one of acrylic and methacrylic acid as a comonomer.

The above-described copolymer can be obtained by radical copolymerization using a catalyst having carboxyl groups. The catalysts include, for example, compounds represented by the general formula;

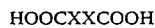

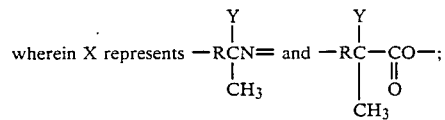

R represents $-CH_2-$, $+CH_2\!\!\not{}_2$ and $+CH_2\!\!\not{}_3$; and Y represents $-CN$ and $-CH_3$.

When a compound represented by the following formula (II) is used as a catalyst for the production of a butadiene-acrylonitrile copolymer having terminal moieties including carboxyl groups as shown in the following formula (III) can be obtained.

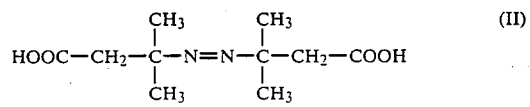

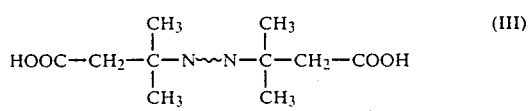

($\sim$ shows copolymer moiety)

Examples for the above-described copolymerization catalysts include 4,4'-azobis-(4-cyanopentanoic acid) and 2,2'-azobis-(4-carboxy-2-methylbutyronitrile).

The preparation of the copolymer can also be conducted by using an anion copolymerization catalyst, for example, organic dilithium compound such as dilithium tetraphenylethane, dilithium trans-stylbene, dilithium polyisoprene, 1,4-dilithium butene or 1,5-dilithium pentan. After a butadiene-acrylonitrile copolymer is produced, the copolymer is subjected to a reaction with $CO_2$ gas, and then to a reaction with an acid such as HCl to produce the copolymer having carboxylic acid groups on at least both terminals of the molecular of the copolymer. The reactions proceed as shown below:

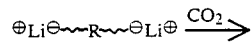

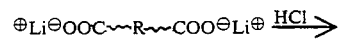

The butadiene-acrylonitrile copolymer is reacted with a diglycidylamine type epoxy resin so that at least terminal carboxyl groups react with epoxy rings. The reaction is carried out by using at least 2 equivalents of the epoxy group per equivalent of the carboxyl group (i.e., the ratio of the total number of epoxy groups in the epoxy resin to the total number of carboxylic acid groups in the copolymer is at least 2). The epoxy resin may be used in an excess amount with respect to the copolymer, and the unreacted epoxy resin remains in the composition as part of component (C). The conditions for the reaction between the copolymer and epoxy resin vary with the type of the epoxy resin. Usually, the reaction is effected at a temperature between 50° and 170° C. for 0.5 to 2 hours in the absence or presence of a catalyst such as triphenylphosphine. The epoxy resin to be reacted with the butadiene-acrylonitrile copolymer may be the same as the one used as component (C) or it may be one or more epoxy resins that are different from the one used as component (C). Example of component (D) include Hycar CTBM (B. F. Goodrich Chemical Co.).

(E) Nitrile Rubber

A nitrile rubber is a copolymer of butadiene and acrylonitrile. A suitable nitrile rubber has a Mooney viscosity between 40 and 110 at 100° C. and an acrylonitrile content of 20 to 45 wt %. Carboxyl-modified nitrile rubbers having not more than 2 wt % of an α or β-unsaturated carboxylic acid such as acrylic acid or methacrylic acid or both as a comonomer may also be used. Illustrative nitrile rubber include Nipole 1043, 1042, 1072 (Nippon Zeon Co.).

(F) Curing agent consisting of dicyandiamide

Dicyandiamide is used as the sole curing agent.

(G) Curing accelerator

Urea compounds conventionally used together with dicyandiamide such as those having formula (IV) may be used as a curing accelerator.

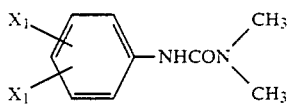

wherein $X_1$ and $X_2$ each represents —OCH$_3$, —NO$_2$, —Cl or H. Suitable examples are 3-(3,4-dichlorophenyl)-1,1-dimethylurea and chlorophenyl-1,1-dimethylurea. Imidazole compounds having formula (V) may also be used as a curing accelerator:

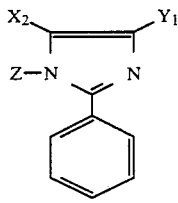

wherein $X_2$ and $Y_1$ each represents —CH$_3$,—CH$_2$OH, and —CH$_2$OCH$_2$CH$_2$CN and Z represents —H and —CH$_2$CH$_2$CN. Suitable examples are 2-phenyl-4-methyl-5-hydroxymethyl imidazole and 2-phenyl-4,5-dihydroxymethyl imidazole. Among these, 3-(3,4-dichlorophenyl)-1,1-dimethylurea is particularly preferred.

Each of the resin components and the curing accelerator may be used as a mixture of two or more compounds.

The butadiene-acrylonitrile copolymer in component (D) is used on an amount of 1.5 to 15 parts by weight, preferably 3 to 12 parts by weight, per 100 parts by weight of the total epoxy resin including epoxy resins (A), (B) and (C) as well as the gylcidyl amine type epoxy resin used in the preparation of component (D). If the content of the copolymer is less than 1.5 parts by weight, the resulting composition does not have sufficient adhesive strength, and if the copolymer content exceeds 15 parts by weight, the composite characteristics of the composition, especially its interlaminer shear strength (ILSS) of a cured product obtained from a composition containing fibers (prepreg), and the heat resistance are decreased. Nitrile rubber as component (E) is contained in an amount of 2 to 8 parts by weight, preferably 3 to 6 parts by weight, per 100 parts by weight of the total epoxy resin. If the content of nitrile rubber is less than 2 parts by weight, the melt viscosity of the composition is decreased and it becomes too fluid to form a desired fillet with the honeycomb. If the nitrile rubber content exceeds 8 parts by weight, not only the heat resistance but also the composite characteristics, especially ILSS, of the composition is reduced.

The proportions of the respective epoxy resins in the total epoxy resin are as follows: bisphenol A type epoxy resin (A) is present in an amount of at least 45 wt %, preferably not more than 65 wt %, more preferably 47 to 63 wt %, and most preferably 50 to 60 wt %; novolak type epoxy resin (B) is present in an amount of at least 10 wt %, preferably not more than 30 wt %, more preferably 15 to 25 wt %; and glycidyl amine type epoxy resin (C) (including the one employed in preparing component (D) is present in an amount of at least 15 wt %, preferably not more than 35 wt %, more preferably 20 to 33 wt %. Bisphenol A type epoxy resin preferably contains 25 to 70 wt %, more preferably 30 to 60 wt %, of a bromated bisphenol A type epoxy resin. If component (A) is present in an amount of less than 45 wt %, the adhesive strength of the resulting composition has a tendency to decrease, and if component (A) is present in an amount greater than 65 wt %, the heat resistance is likely to decrease. If the amount of component (B) is less than 10 wt %, the heat resistance of the resulting composition tends to decrease and if the content exceeds 30 wt %, the adhesive strength will decrease. If the content of component (C) is less than 15 wt %, the heat resistance of the resulting composition is apt to decrease and a prepreg prepared from the composition by incorporating fibers is prone to have a low ILSS. If the content of component(C) exceeds 35 wt %, the adhesive strength will be decreased.

The curing agent consisting of dicyandiamide is usually present in an amount of 2 to 8 parts by weight, preferably 3 to 6 parts by weight, per 100 parts by weight of the total epoxy resin. The curing accelerator is usually contained in an amount of 2 to 8 parts, preferably 3 to 6 parts by weight, per 100 parts by weight of the total epoxy resin.

The resin composition of the present invention may contain fine silica or glass particles (usually having an average diameter of 0.1 to 20 μ) to prevent the flowing of the resin composition when it is shaped with heat. The fine silica or glass powder is generally used in an amount of 1 to 10 parts by weight per 100 parts by weight of the resin composition. The resin composition may be rendered flame-retardant by incorporating 1 to 5 parts by weight of fine particles (usually having an average diameter of 0.1 to 20 μ) of antimony trioxide per 100 parts by weight of the resin composition. By incorporating a metal borate, such as borate of Zn and Ca, and mixture thereof, the resin composition may be rendered smoke retardant. The metal borate usually incorportated in the composition in an amount of 3 to 10 parts by weight per 100 parts by weight of the resin composition. A flow controlling agent such as an acrylic oligomer (e.g. "Nikalite" produced by Nippon Carbide Co.) may also be incorporated to the resin composition, usually in an amount of 1 to 5 parts by weight per 100 parts by weight of the resin composition.

The epoxy resin composition of the present invention can be prepared by blending the above listed essential components and optional engredients. The so obtained composition may be directly used as an adhesive and achieves particularly high bond strength when applied to resins such as aromatic polyamides, phenolic resins, and unsaturated polyester resins; glass; and metals such as aluminum, iron, etc. The resin composition of the present invention can also be used as a prepreg after incorporating therein reinforcing fibers such as carbon fibers, aromatic polyamide fibers and glass fibers. These fibers are used in the form of a strand, tow, woven fabric, nonwoven fabric, or short fibers cut to a length between about 1 and 100 mm.

The prepreg of the present invention may be produced by any conventional method, for example, by the following methods. The resin composition described above is dissolved in a solvent such as acetone, methyl ethyl ketone or methyl cellosolve, in a preferred concentration of 30 to 60 wt %. Reinforcing fibers are impregnated with the solution, usually, by dipping the fibers into the solution, taking them out from the solution and drying to remove the solvent at a temperature which is generally between 90° and 120° C. cover a period of 5 to 15 minutes. Usually, a sheet-like prepreg is formed. Alternatively, mixed resin composition of the present invention is melted at about 50 to 120° C., and the melted composition is coated on a releasing paper, usually in an amount of 30 to 300 g/m². On the resin surface of the thus prepared product fibers are placed and embedded into the resin under pressure, for example, by a heat roller to prepare a sheet-like prepreg having a releasing paper.

The fiber content of the composition (prepreg) is usually from 80 to 40 wt % based on the total weight of the composition.

The conditions for curing the prepreg or prepregs of the present invention vary with the type of the epoxy resin used. The prepreg is usually cured at between 120° and 140° C. for 1 to 5 hours. To prevent the formation of voids, the prepreg or prepregs are typically cured under a pressure of 3 to 7 kg/cm².

The prepreg according to the present invention may be used advantageously in the production of a shaped article, particularly a honeycomb sandwich panel. Particularly suitable examples of the honeycomb that can be used with the prepreg include aromatic fibers impregnated with a phenolic resin, glass fibers impregnated with a phenolic resin or an unsaturated polyester resin, and aluminum. The honeycomb sandwich panel prepared from the prepreg of the present invention has good composite characteristics, especialy high ILSS, as well as great heat resistance.

The present invention is described in greater detail by reference to the following examples and comparative examples. However, the scope of the invention is not limited to these examples.

EXAMPLE 1

A mixture of 50 g of a butadiene-acrlonitrile copolymer (Hycar-CTBN 1300 ×13 of B. F. Goodrich Chemical Co.) and 100 g of an epoxy resin (Araldite MY 720 of Ciba-Geigy Corporation) was reacted with 0.4 g of triphenylphosphine at 170° C. for an hour and a half.

The resulting product (D) was blended with two bisphenol A type epoxy resins (A), i.e. 300 g of Epikote 828 of Shell Chemicals Corp. and 250 g of bromated bisphenol A type epoxy resin DER 511 of Dow Chemical Company; 200 g of Dow Epoxy DEN 485 of Dow Chemical Company as novolack type epoxy resin (B); 150 g of Araldite MY 720 of Ciba-Geigy Corporation as glycidyl amine type epoxy resin (C); 50 g of Nipole 1072 as nitrile rubber (E); 40 g of curing agent dicyandiamide (DICY) as component (F): 50 g of 3-(3,4-dichlorophenyl)-1,1-dimethylurea (DMV) as curing accelerator or component (G): and 30 g of antimony oxide ($Sb_2O_3$) as a flame-retardant. As a result, an epoxy resin composition having good adhesive properties was obtained.

EXAMPLE 2

The resin composition prepared in Example 1 was dissolved in a mixed solvent of acetone and methyl cellosolve (2:1 weight) to form a 50 wt % solution. This resin solution was impregnated in carbon fibers (CF), Besphite W-3101 (woven of 200 g/m²; product of Toho Beslon Co., Ltd.), which were then dried at 80° C. for one hour to form a prepreg with a resin content of 42 wt %.

Two pieces of this prepreg were laid over both sides of a glass fiber reinforced platic honeycomb HRP 3/16-40 (product of Hexel Co., Ltd., plastic: a phenol resin). The laminate was shaped into a honeycomb sandwich panel in an autoclave at 130° C. by applying a pressure of 3 kg/cm² for 90 minutes.

Fourteen pieces of the same prepreg were superposed each other and pressed into a sheet sample under the same conditions as used above.

The adjesive strength of the honeycomb sandwich panel was checked by measuring its flatwise tensile strength in accordance with MIL specification 401 B "Flatwise Tension". The interlaminar shear strength (ILSS) of the sheet sample was measured as a parameter of their composite characteristics. The results were as follows.

| Flatwise tensile strength of the honeycomb sandwich panel | | 42 kg/cm² |
|---|---|---|
| ILSS of the sheet sample | 23° C.: | 6.7 kg/mm² |
| | 70° C.: | 5.2 kg/mm² |

EXAMPLE 3

An epoxy resin composition was prepared from the same formulation as used in Example 1. It was impregnated in strands of uniaxially oriented glass fibers RS48PJ-452 (product of Nittobo Co.) to form prepregs. The glass fibers had a tensile strength of 250 kg/mm² and their content in the prepregs was 67 wt %. The weight of the glass fiber in the prepreg was 217 g/m². A honeycomb sandwich panel was prepared from these prepregs in the same manner as in Example 2 except that 3 prepregs were superposed on the honeycomb in such a manner that the orientation of fibers in the first prepreg (which contacts with the honeycomb) is 0° with respect to the ribbon direction of the honeycomb, 90° in the second prepreg and 0° in the third prepreg. Additionally, a laminated sheet using 18 sheet of the prepregs were produced in the same manner as in Example 2. Their preformance was tested. The following results were obtained.

| Flatwise tensile strength of the honeycomb sandwich panel | | 34 kg/cm² |
|---|---|---|
| ILSS of the sheet sample | 23° C.: | 7.0 kg/mm² |
| | 70° C.: | 5.6 kg/mm² |

EXAMPLE 4

An epoxy resin composition was prepared from the same formulation as used in Example 1. It was impregnated in strands of uniaxially oriented Kevlar 49 (aromatic polyamide fiber of Du Pont) to form prepregs. 1000 Kevler filaments had a fineness of 1420 d, and a tensile strength of 300 kg/mm², its content in the prepregs was 52 wt % and the fiber weight in the prepreg was 122 g/m². A honeycomb sandwich panel and a laminated sheet were prepared from sheses prepregs as in Example 2 and their performance was tested. The results were as follows.

| Flatwise tensile strength of the honeycomb sandwich panel | | 42 kg/cm² |
|---|---|---|
| ILSS of the sheet sample | 23° C.: | 7.0 kg/mm² |
| | 70° C.: | 5.7 kg/mm² |

EXAMPLE 5 TO 11 AND COMPARATIVE EXAMPLES 1 TO 7

Resin compositions having the formulation indicated in Table 1 were prepared as in Example 1, and from these compositions, prepregs were fabricated as in Example 2. Honeycomb sandwich panels and laminated sheets were prepared from the prepregs and tested for their flatwise tensile strength and ILSS, respectively. The results are listed in Table 1.

TABLE 1

| | | Examples | | | | | | | Comparative Examples | | | | | | |
|---|---|---|---|---|---|---|---|---|---|---|---|---|---|---|---|
| | | 4 | 5 | 6 | 7 | 8 | 9 | 10 | 1 | 2 | 3 | 4 | 5 | 6 | 7 |
| Epikote | 828 | 250 | 100 | 450 | 200 | 370 | 350 | 200 | 300 | 300 | 300 | 300 | | 300 | 300 |
| Epikote | 834 | 100 | | | | | | | | | | | | | |
| DER | 511 | | 250 | 250 | 250 | 250 | 250 | 250 | 250 | 250 | 250 | 250 | (0) | 250 | 250 |
| Epicron S | 123 | | 250 | | | | | | | | | | | | |
| Dow Epoxy DEN | 485 | | 300 | 100 | 350 | 80 | 150 | 150 | 200 | 200 | 200 | 200 | 500 | | 450 |
| ECN | 1273 | 200 | | | | | | | | | | | | (0) | |
| MY | 720 | | 350 | 200 | 200 | 300 | 150 | 400 | 250 | 250 | 250 | 250 | 500 | 450 | |
| Epototo YH | 434 | 200 | | | | | | | | | | | | | (0) |
| Hycar (CTBM) | | 40 | 50 | 50 | 50 | 50 | 50 | 50 | (2) | (160) | 50 | 50 | 50 | 50 | 50 |
| Nipolo | 1072 | 30 | 50 | 50 | 50 | 50 | 50 | 50 | 50 | 50 | (2) | (10) | 50 | 50 | 50 |
| Flatwise tensile strength (kg/cm) | | 42 | 37 | 45 | 39 | 40 | 41 | 39 | 27 | 43 | 30 | 41 | 28 | 36 | 32 |
| ILSS (kg/mm) | | | | | | | | | | | | | | | |
| 23° C. | | 7.1 | 6.7 | 6.5 | 6.8 | 6.1 | 6.2 | 6.9 | 7.3 | 5.9 | 6.3 | 5.8 | 6.4 | 6.0 | 6.1 |
| 70° C. | | 5.3 | 5.1 | 4.8 | 4.7 | 4.7 | 4.2 | 5.6 | 5.3 | 3.9 | 4.9 | 3.7 | 5.1 | 4.9 | 4.6 |

Note 1. In all examples and comparative example, DICY/DMU = 40g/50g, $Sb_2O_3$: 30 g, reinforcing fiber : carbon fiber fabric.
Note 2. The contents of the respective ingredients are in grams.
Note 3. Values in parentheses are outside the scope of the present invention As is seen from the data in Table 1, the samples having the resin formulations within the range specified by the present invention had high flatwise tensile strength and ILSS values. However, the samples having the resin formulations outside the specified range had low ILSS values when they had high flatwise tensile strength values (comparative Examples 2 and 4), and low flatwise tensile strength values when they had high ILSS levels (Comparative Examples 1, 3, 5 and 7).

While the invention has been described in detail and with reference to specific embodiments thereof, it will be apparent to one skilled in the art that various changes and modifications can be made therein without departing from the spirit and scope thereof.

What is claimed is:

1. An epoxy resin composition comprising:
   (A) a condensation product of bisphenol A and epichlorohydrine present in an amount of at least 45 wt % of the total epoxy resin
   (B) a reaction product of novolak resin and epichlorohydrine present in an amount of at least 8 wt % of the total epoxy resin;
   (C) an epoxy resin having at least one N,N-diglycidylamine group in a molecule of the epoxy resin (including the one used in (D)) present in an amount of at least 15 wt % of the total epoxy resin;
   (D) a reaction product of a butadiene-acrylonitrile copolymer having carboxyl groups on at least both ends of the molecule and an epoxy resin having at least one N,N-diglycidylamine group in a molecule of the epoxy resin, said butadiene-acrylonitrile copolymer being present in an amount of 1.5 to 15 parts by weight per 100 parts by weight of the total epoxy resin; (E) nitrile rubber present in an amount of 2 to 8 parts by weight per 100 parts by weight of the total epoxy resin; wherein the total epoxy resin is the total amount of epoxy resins (A), (B) and (C), as well as the epoxy resin having at least one N,N-diglycidylamine group in a molecule of the epoxy resin used in preparing component (D);
   (F) a curing agent consisting of dicyandiamide; (G) a curing accelerator, and (H) a reinforcing carbon fiber.

2. An epoxy resin composition as claimed in claim 1 wherein the condensation product of bisphenol A and epichlorohydrine is nonbrominated and has an average epoxy equivalent of from 150 to 1,000.

3. An epoxy resin composition as claimed in claim 1 wherein the condensation product of bisphenol A and epichlorohydrine is brominated and has an average epoxy equivalent of 200 to 600.

4. An epoxy resin composition as claimed in claim 1 wherein the reaction product of novolak resin and epichlorohydrine further comprises at least one resin selected from the group consisting of a phenolic novolak epoxy resin and a cresol novolak epoxy resin.

5. An epoxy resin composition as claimed in claim 4 wherein the phenolic novolak resin has an average epoxy equivalent of from 160 to 200.

6. An epoxy resin composition as claimed in claim 4 wherein the cresol novolak epoxy resin has an epoxy equivalent of from 180 to 260.

7. An epoxy resin composition as claimed in claim 1 wherein the glycidylamine type epoxy resin has at least one N,N-diglycidylamino group in a molecule thereof.

8. An epoxy resin composition as claimed in claim 1 wherein the epoxy resin having at least one N,N-diglycidylamino group in a molecule has an average epoxy equivalent of from 110 to 150.

9. An epoxy resin composition as claimed in claim 1, wherein the epoxy resin having at least one N,N-diglycidylamino group in a molecule is a resin selected from the group consisting of N,N,N',N'-tetraglycidyl-diaminodiphenylmethane N,N-diglycidylmethaaminophenol glycidyl ether and N,N-diglycidylparaaminophenol glycidyl ether.

10. An epoxy resin composition as claimed in claim 1 wherein the butadiene-acrylonitrile copolymer in component (D) is liquid.

11. An epoxy resin composition as claimed in claim 10 wherein said copolymer has a viscosity of from 500 to 8,000 poise at 27° C.

12. An epoxy resin composition as claimed in claim 1 wherein the butadiene-acrylonitrile copolymer has an acrylonitrile content of from 10 to 35 wt %.

13. An epoxy resin composition as claimed in claim 1 wherein the nitrile rubber has a Mooney viscosity of 40 to 110 at 100° C. and an acrylonitrile content of 20 to 45 wt %.

14. An epoxy resin composition as claimed in claim 1 wherein the nitrile rubber is a carboxyl modified nitrile rubber having not more that 2 wt % of at least one acid selected from the group consisting acrylic acid and methacrylic acid.

15. An epoxy resin composition as claimed in claim 1, wherein said bisphenol A is contained in an amount of 45 to 65 wt % of the total epoxy resin.

16. An epoxy resin composition as claimed in claim 1, wherein said reaction product of novolak resin and epichlorohydrine is contained in an amount of 8 to 30 wt % of the total epoxy resin.

17. An epoxy resin composition as claimed in claim 1, wherein said epoxy resin having at least one N,N-diglycidylamino group in a molecule is contained in an amount of 15 to 35 wt % of the total epoxy resin.

18. An epoxy resin composition as claimed in claim 1, wherein said condensation product of bisphenol A and epichlorohydrine further comprises 25-70 wt % of a non-brominated bisphenol A epoxy resin and 75-30 wt % of a brominated bisphenol A epoxy resin.

19. An epoxy resin composition as claimed in claim 1 wherein said dicyandiamide is used in an amount of 2 to 8 parts by weight per 100 parts by weight of the resin composition.

20. An epoxy resin composition as claimed in claim 1 wherein the accelerator is used in an amount of from 2 to 8 parts by weight per 100 parts by weight of the resin composition.

21. An epoxy resin composition as claimed in claim 1 which contains fine particles of at least one of materials selected from the group consisting silica and glass particles.

22. An epoxy resin composition as claimed in claim 1 which contains fine antimony trioxide particles.

23. An epoxy resin composition as claimed in claim 1 which contains at least one metal borate.

24. An epoxy resin composition as claimed in claim 1 which contains at least one flow controlling agent.

25. An epoxy resin composition as claimed in claim 1, wherein the fiber is contained in an amount of 40 to 80 wt % based on the total weight of the resin composition.

26. An epoxy resin composition as claimed in claim 1, wherein said reaction product of novolak resin and epichlorohydrine has a molecular weight of 400 to 900.

* * * * *